United States Patent
Chou et al.

(10) Patent No.: US 10,005,178 B1
(45) Date of Patent: Jun. 26, 2018

(54) COLLAPSIBLE STAND

(71) Applicant: Rexon Industrial Corp., Ltd., Taichung (TW)

(72) Inventors: Thing-Tai Chou, Taichung (TW); Hung Jung Chiang, Taichung (TW); Chia-Wei Lin, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days. days.

(21) Appl. No.: 15/701,501

(22) Filed: Sep. 12, 2017

(30) Foreign Application Priority Data

Dec. 6, 2016 (TW) .............................. 105140278 A

(51) Int. Cl.
| | |
|---|---|
| B25H 1/00 | (2006.01) |
| B25H 1/06 | (2006.01) |
| F16M 11/38 | (2006.01) |
| F16M 11/42 | (2006.01) |

(52) U.S. Cl.
CPC ......... *B25H 1/0042* (2013.01); *B25H 1/0035* (2013.01); *B25H 1/06* (2013.01); *F16M 11/38* (2013.01); *F16M 11/42* (2013.01); *F16M 2200/06* (2013.01)

(58) Field of Classification Search
CPC .......... B25H 1/0042; B25H 1/00; B25H 1/04; B25H 1/0035; B25H 1/06; F16M 11/38; F16M 11/32; F16M 11/02; F16M 11/42; F16M 11/24; F16M 2200/06; A47K 1/04; A47K 5/12
USPC ....... 248/164, 166, 431, 169, 173, 171, 440, 248/440.1
See application file for complete search history.

(56) References Cited

U.S. PATENT DOCUMENTS

| | | | |
|---|---|---|---|
| 6,607,015 B1 | 8/2003 | Chen | |
| 6,942,229 B2 * | 9/2005 | Brazell | B25H 1/04 108/119 |
| 7,044,496 B2 * | 5/2006 | Holmes | A61G 1/0293 280/47.131 |
| 7,584,935 B2 * | 9/2009 | Chen | B25H 1/04 248/647 |
| 7,882,870 B2 * | 2/2011 | Lee | B25H 1/04 144/286.1 |
| 8,523,123 B2 * | 9/2013 | Chiu | A47B 31/04 108/115 |

(Continued)

FOREIGN PATENT DOCUMENTS

| | | |
|---|---|---|
| TW | I289101 B | 11/2007 |
| TW | I570348 B | 2/2017 |

*Primary Examiner* — Nkeisha Smith
(74) *Attorney, Agent, or Firm* — Bacon & Thomas, PLLC

(57) ABSTRACT

A collapsible stand mainly includes a support unit including two stand legs pivotally connected together in a crossed manner and a support arm set pivotally connected to one stand leg, a positioning unit including an abutment member and a bearing member respectively mounted at one stand leg and the support art set and so configured that when the collapsible is extended out or collapsed, the abutment member is engaged with a different part of the bearing member, and a control unit mounted at one stand leg and operable to bias the abutment member, moving the abutment member into engagement or away from the bearing member. Thus, the collapsible stand has a simple structure, facilitates operation and ensures a high level of operational safety and structural stability.

10 Claims, 9 Drawing Sheets

(56) References Cited

U.S. PATENT DOCUMENTS

| | | | |
|---|---|---|---|
| 8,910,970 B2 * | 12/2014 | Chen ........................ | B25H 1/04 |
| | | | 280/652 |
| 9,149,926 B2 * | 10/2015 | Chen ...................... | F16M 11/38 |
| 9,186,736 B1 * | 11/2015 | Chang ................ | B23D 57/0092 |
| 9,533,410 B2 * | 1/2017 | Chiang ................ | B25H 1/0042 |

* cited by examiner

COLLAPSIBLE STAND

BACKGROUND OF THE INVENTION

1. Field of the Invention

The present invention relates to cutting tool stands, and more particularly to a collapsible stand.

2. Description of the Related Art

In order to facilitate delivery between different workplaces, machine tool stands for regular small-scale machine tools commonly have a folding design so that the stands can be alternatively set between an extended position and a folded position.

Various machine tool stands are known. For example, Taiwan Patent I289101 teaches the use of a pedal to move four links, where these four links are forced to carry one respective wheel seat when lifting the base from the floor. The wheel seats must have enough structural strength so that the expected effects can be achieved. Further, U.S. Pat. No. 6,607,015 discloses a foldable worktable. This foldable worktable is functional; however, it is still not convenient for use because the legs of this foldable worktable are not equipped with rollers for convenient movement with the machine tool when the foldable worktable is folded up. Further, U.S. Pat. No. 6,942,229 discloses a collapsible stand for a bench-top power tool. This design of collapsible stand has a pair of wheels rotatably connected to the base thereof for transporting the stand and power tool thereupon. However, when in use, the stand must be converted to a position perpendicular to the floor in order to collapse the support legs; where due to the weight of the machine tool supported thereon it is much heavier than the stand itself. Therefore, when biasing the stand, it is likely to be dangerous to the operator.

Further, Taiwan Patent Application No. 103143928 discloses a foldable stand, which uses a first pedal and a second pedal to control a first link and a second link respectively, allowing the stand to be conveniently and rapidly set between an extended position and a folded position.

SUMMARY OF THE INVENTION

The present invention has been accomplished in view of the aforementioned circumstances. It is therefore one of the main objects of the present invention to provide a collapsible stand, which has a simple structure, facilitates operation and ensures a high level of operational safety and structural stability.

To achieve this and other objects of the present invention, a collapsible stand comprises a support unit, a positioning unit, and a control unit. The support unit comprises a first stand leg and a second stand leg. The first stand leg and the second stand leg are crossed and pivotally connected with each other so that the first stand leg and the second stand leg can be moved between an extended position and a folded position. The support unit further comprises a support arm set pivotally connected to the first stand leg for supporting a tool. The positioning unit comprises a mounting member, an abutment member, an elastic member and a bearing member. The mounting member is fixedly mounted at the first stand leg. The abutment member is pivotally connected to the mounting member, comprising an abutment end portion. The elastic member has two opposite ends thereof respectively abutted against the mounting member and the abutment member. The bearing member is mounted at the support arm set, comprising a first engagement structure and a second engagement structure. The control unit comprises a pedal pivotally connected to the first stand leg. The pedal is connected to the abutment member and operable to bias the abutment member toward the bearing member. When the first stand leg and the second stand leg are set in the extended position, the abutment end portion is engaged with the first engagement structure. On the contrary, when the first stand leg and the second stand leg are set in the collapsed position, the abutment end portion is engaged with the second engagement structure.

The beneficial effects of the present invention are as follows: When collapsing the collapsible stand, the user simply needs to step on the pedal, which biases the abutment member away from the bearing member, thus, when the support arm set is forced by its weight due to gravity to bias backwards, the user can easily push the first stand leg to collapse the collapsible stand. Thus, the operation of the collapsible stand is very simple with a low amount of effort. Further, when extending out the collapsible stand, the abutment member is moved to abut against the bearing member, allowing the processing tool to be steadily mounted on the support arm set, thus, the collapsible stand ensures a high level of operational safety and structural stability.

Other advantages and features of the present invention will be fully understood by reference to the following specification in conjunction with the accompanying drawings, in which like reference signs denote like components of structure.

DETAILED DESCRIPTION OF THE INVENTION

Figure 1:
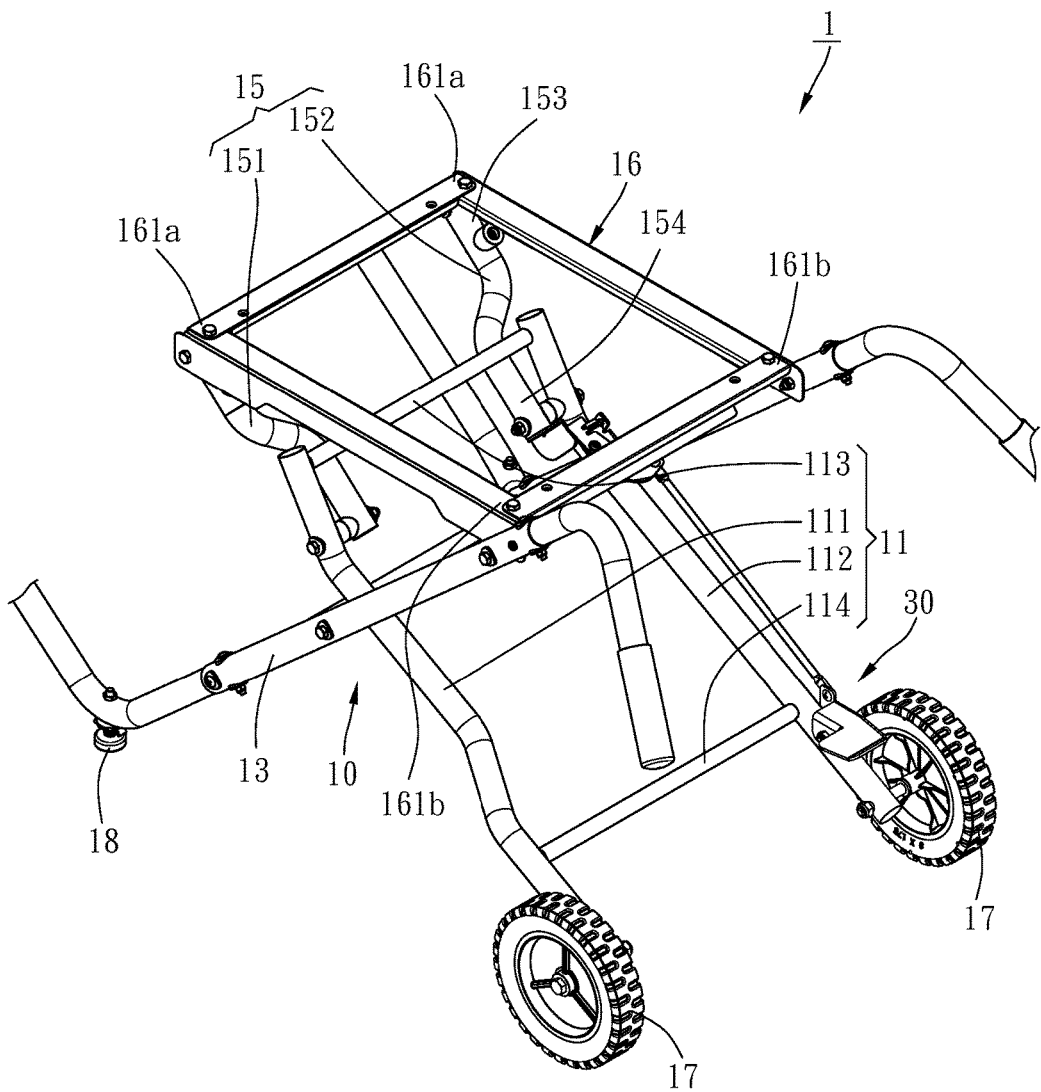
FIG. 1 is an oblique top elevational view of a collapsible stand in an extended position in accordance with the present invention.

Referring to the annexed drawings in detail, a collapsible stand 1 in accordance with the present invention is shown. For convenience of explanation, the following embodiment uses the rear end of the first stand leg 11 at which the rollers 17 are located as a directional reference (as shown in FIG. 1). As illustrated, the collapsible stand 1 comprises a support 10, a positioning unit 20, and a control unit 30.

Figure 2:
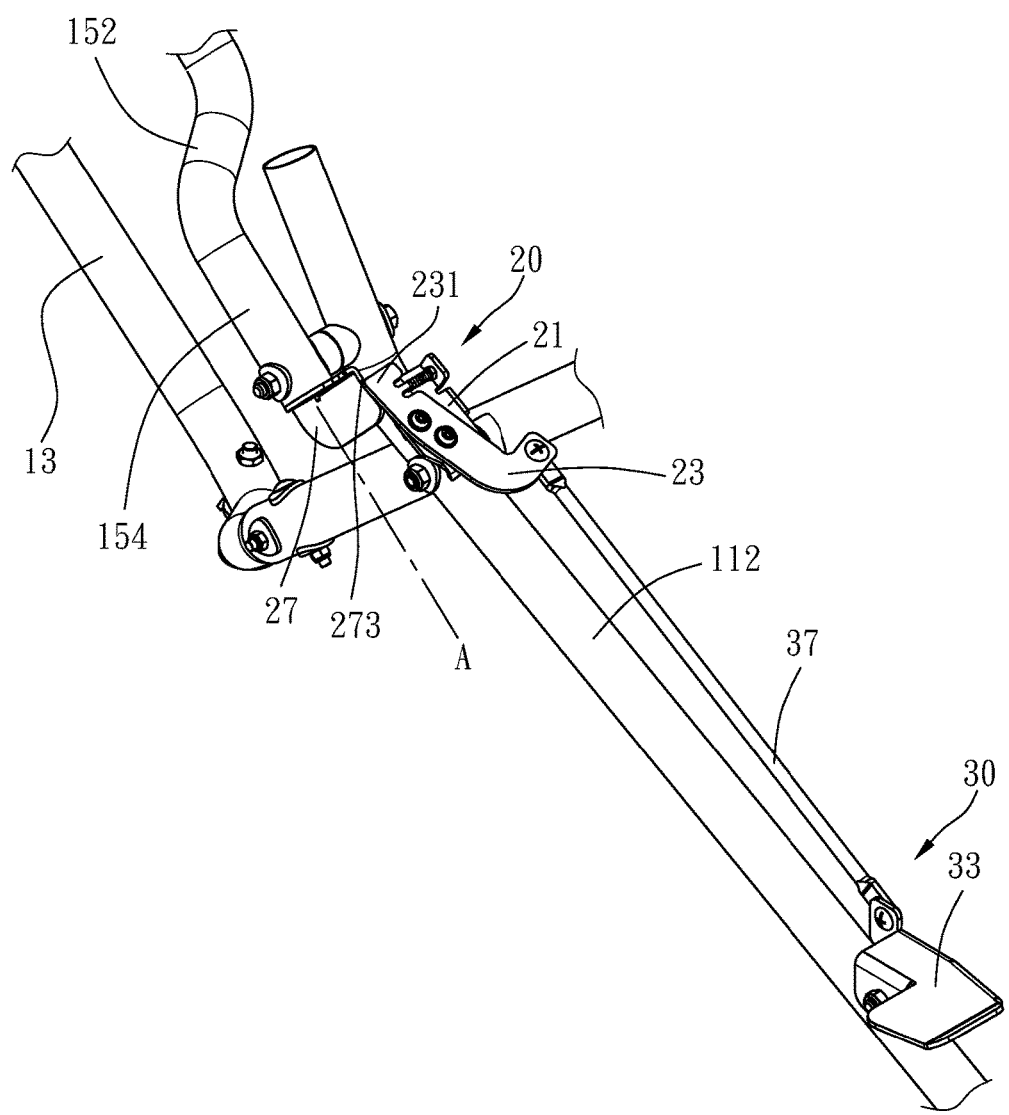
FIG. 2 is enlarged view of a part of the collapsible stand shown in FIG. 1.

Referring to FIG. 1 and FIG. 2, the support unit 10 comprises a first stand leg 11, a second stand leg 13 and a support arm set 15. The first stand leg 11 and the second stand leg 13 are crossed and pivotally connected with each other so that the first stand leg 11 and the second stand leg 13 are movable between an extended position and a folded position. The first stand leg 11 comprises a left leg shaft 111, a right leg shaft 112, and a front transverse bar 113 and a rear transverse bar 114 respectively and transversely connected between opposite front and rear ends of the left and right leg shafts 111, 112. The support arm set 15 comprises a first support arm 151 and a second support arm 152. The first and second support arms 151, 152 are respectively pivotally connected to the left leg shaft 111 and the right leg shaft 112 near the front transverse bar 113. The second support arm 152 comprises a top connection end portion 153 and an opposing bottom connection end portion 154. The bottom connection end portion 154 is a tubular member comprising a virtual axis A. The second support arm 152 is pivotally connected to the right leg shaft 112 by means of the bottom connection end portion 154. The support unit 10 further comprises a carrier platform 16, two rollers 17 and two foot pads 18. The carrier platform 16 is a hollow rectangular frame adapted for supporting a cutting tool (not shown), comprising four corner ends 161a, 161b. The two rear corner ends 161b are respectively pivotally connected to the top end of the first stand leg 11 and the top end of the second stand leg 13. The two front corner ends 161a are movable with the carrier platform 16 relative to the second stand leg 13 and supportable on the first and second support arms 151, 152. The two rollers 17 are bilaterally and pivotally mounted at the bottom end of the first stand leg 11 for moving the support unit 10. The two foot pads 18 are mounted at the bottom end of the second stand leg 13 for direct contact with the floor.

Figure 3:
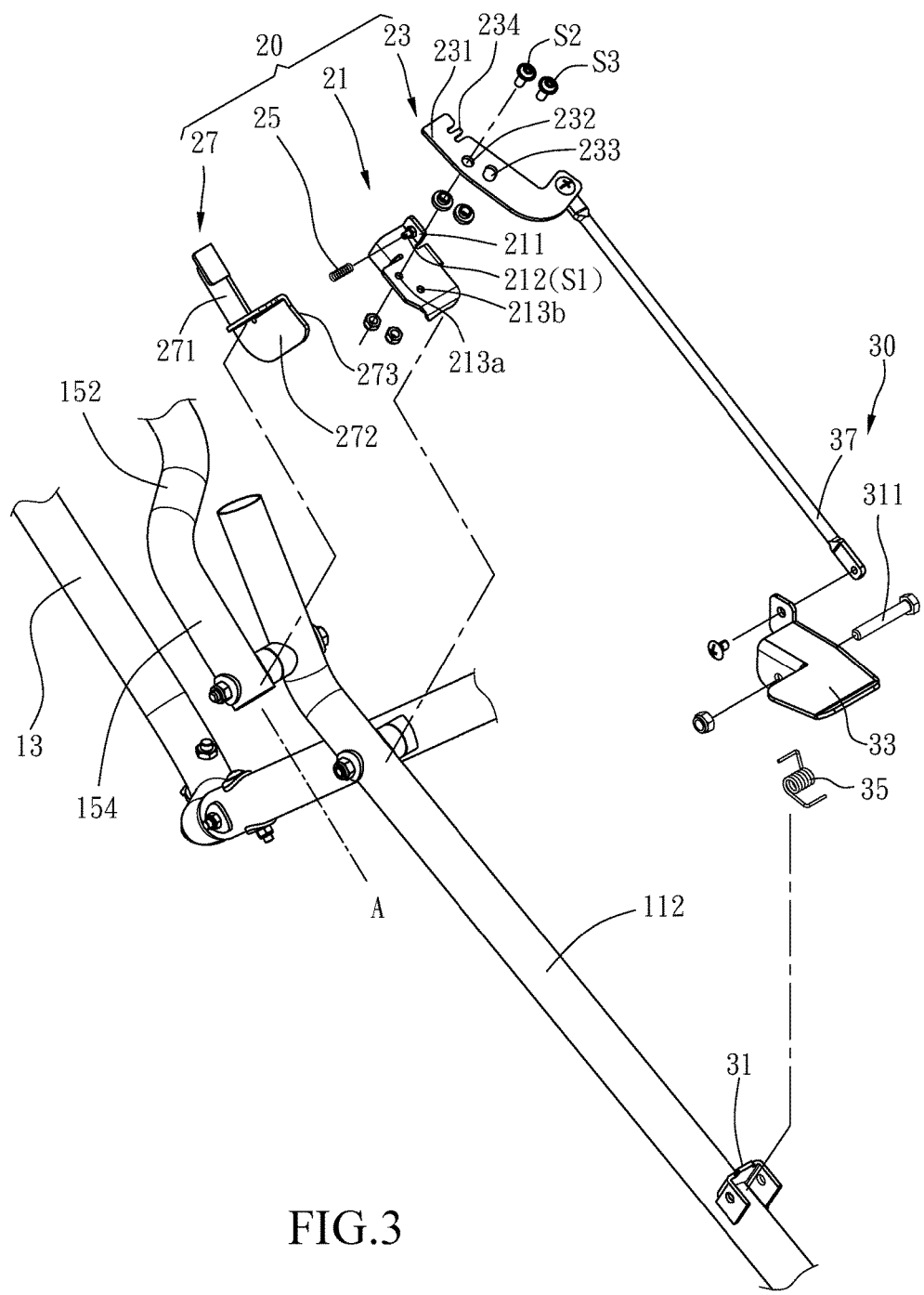
FIG. 3 is an exploded view of a part of the collapsible stand shown in FIG. 1.
Figure 4:
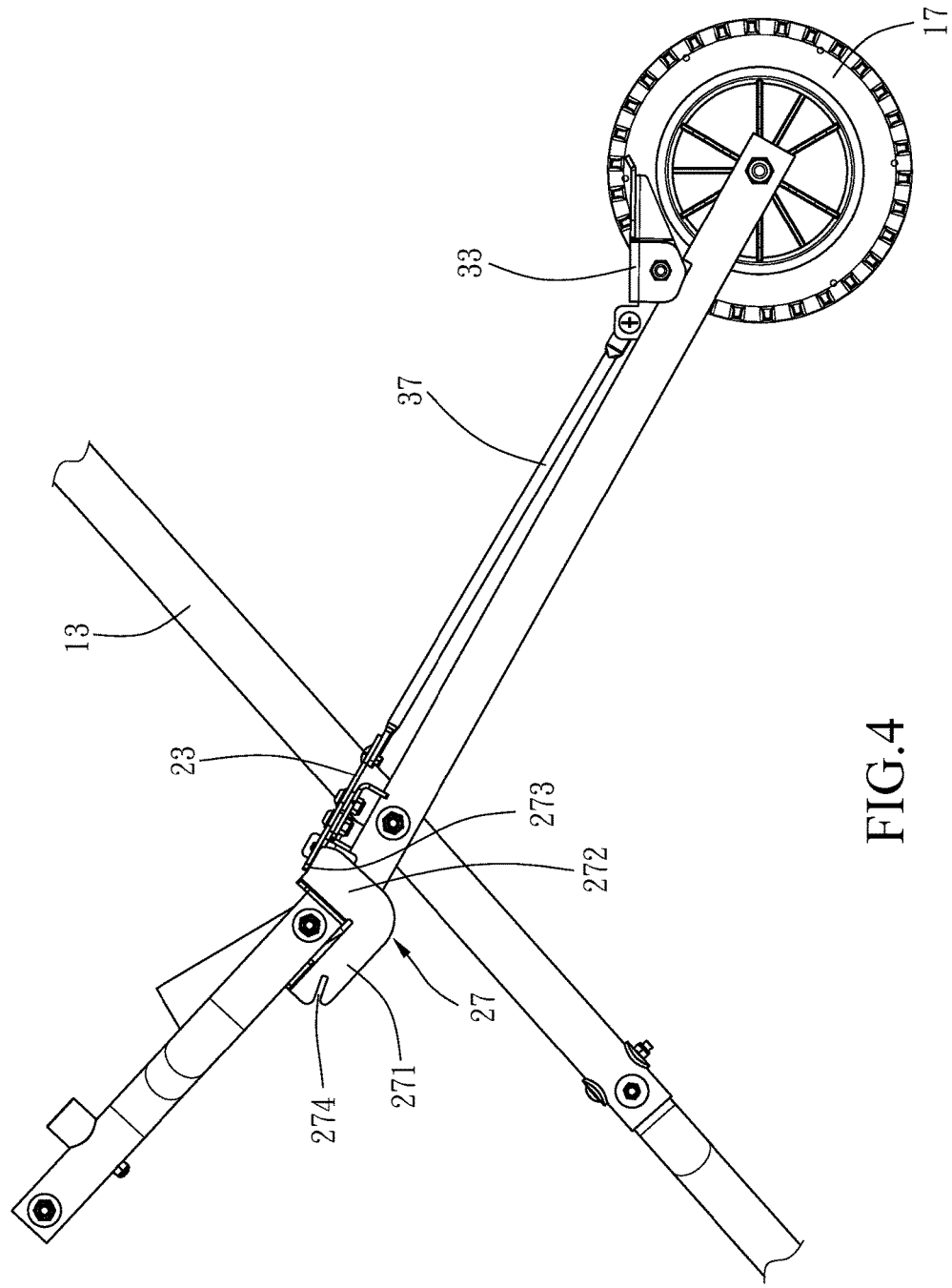
FIG. 4 is a sectional side view of a part of the collapsible stand in accordance with the present invention.
Figure 5:
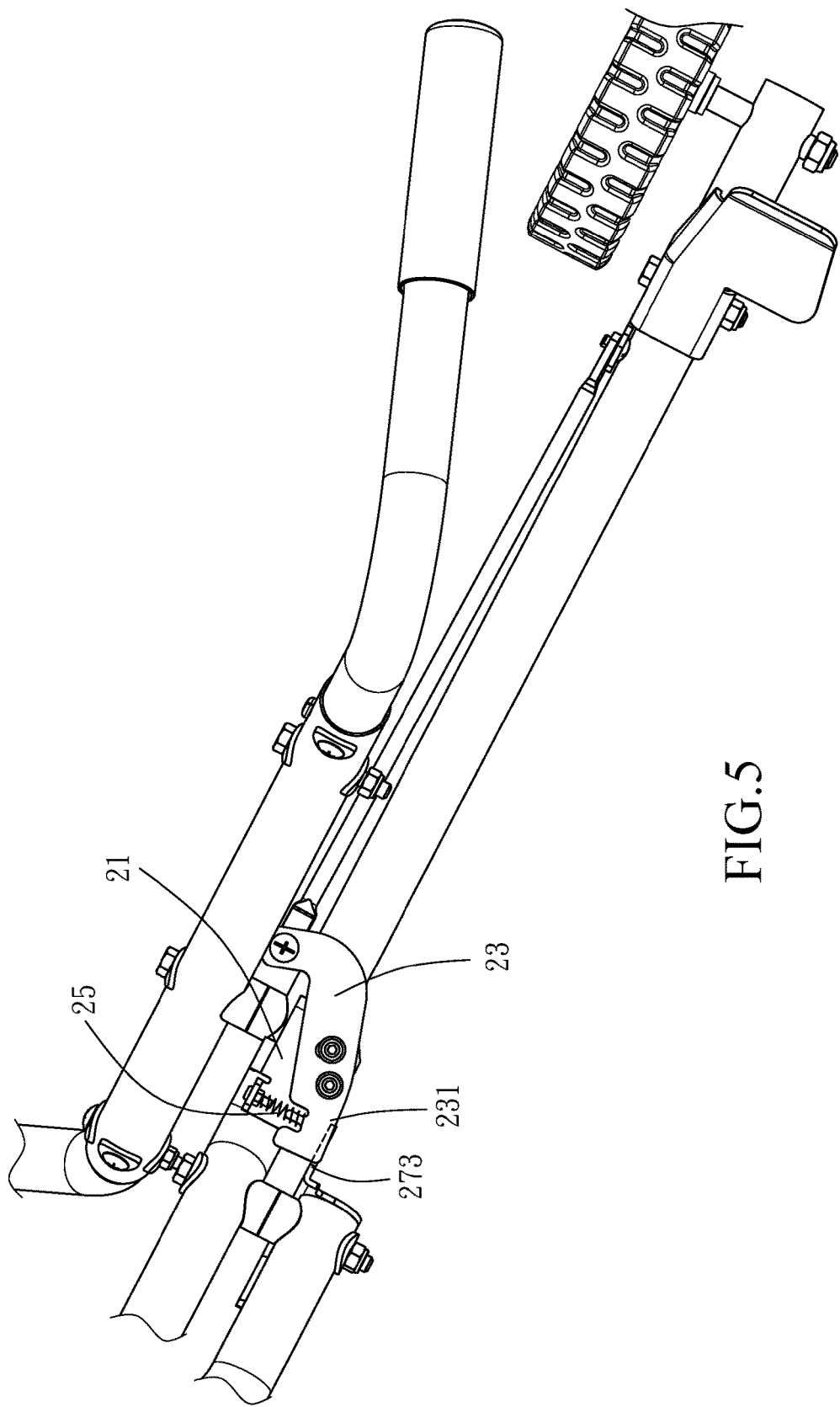
FIG. 5 is a top view of a part of the collapsible stand in accordance with the present invention, illustrating the abutment member abutted against the first engagement structure.

Referring to FIGS. 2-4, the positioning unit 20 comprises a mounting member 21, an abutment member 23, an elastic member 25 and a bearing member 27.

The mounting member 21 is fixedly connected to the right leg shaft 112 of the first stand leg 11, comprising an upright wall 211, a first rod 212 and two through holes 213a, 213b defined therein. The first rod 212 in this embodiment is a screw S1 mounted at the upright wall 211. The through holes 213a, 213b are adapted for allowing the respective screws S2, S3 to pass therethrough The abutment member 23 is mounted at a top side of the mounting member 21, comprising an abutment end portion 231, a second rod 234, a through hole 232, an elongated slot 233 defined therein. The abutment end portion 231 is located at one side of the abutment member 23 for abutment against the bearing member 27. The through hole 232 and the elongated slot 233 are respectively located corresponding to the two through holes 213a, 213b of the mounting member 21 so that the abutment member 23 can be pivotally connected to the top side of the mounting member 21 by the screw S2, and the screw S3 can be inserted through the elongated slot 233 to limit the biasing angle of the abutment member 23. The second rod 234 is located at the abutment member 23 opposite to the abutment end portion 231 to face toward the first rod 212.

The elastic member 25 in the present preferred embodiment is a compression spring with two opposite ends respectively sleeved onto the first rod 212 of the mounting member 21 and the second rod 234 of the abutment member 23 for constantly pushing the abutment member 23 toward the bearing member 27.

The bearing member 27 is mounted at the bottom connection end portion 154 of the second support arm 152. The bearing member 27 is substantially L-shaped, comprising a horizontal end portion 271 and a vertical end portion 272. The horizontal end portion 271 extends in parallel to the axis A of the bottom connection end portion 154, and the vertical end portion 272 extends perpendicular to the axis A of the bottom connection end portion 154. The bearing member 27 further comprises a first engagement structure 273 and a second engagement structure 274 (see FIG. 4). The first engagement structure 273 is located at the vertical end portion 272. The first engagement structure 273 is substantially an end edge of the bearing member 27. The second engagement structure 274 is located at the horizontal end portion 271. In this embodiment, the second engagement structure 274 is a retaining groove.

The control unit 30 comprises a holder block 31, a pedal 33, a torsion spring 35 and a link 37. The holder block 31 is fixedly mounted at the right leg shaft 112 of the first stand leg 11. The pedal 33 and the torsion spring 35 are pivotally connected to the holder block 31 by a pivot axle 311 (a screw bolt) so that the pedal 33 can be alternatively turned upwards and downwards about the pivot axle 311. The link 37 has two opposite ends thereof respectively and pivotally connected to the abutment member 23 and the pedal 33. When the pedal 33 is biased by an external force, it drives the abutment member 23 to turn toward or away from (leftward or rightward) relative to the bearing member 27, further controlling the abutment end portion 231 to selectively abut against the bearing member 27.

Figure 6:
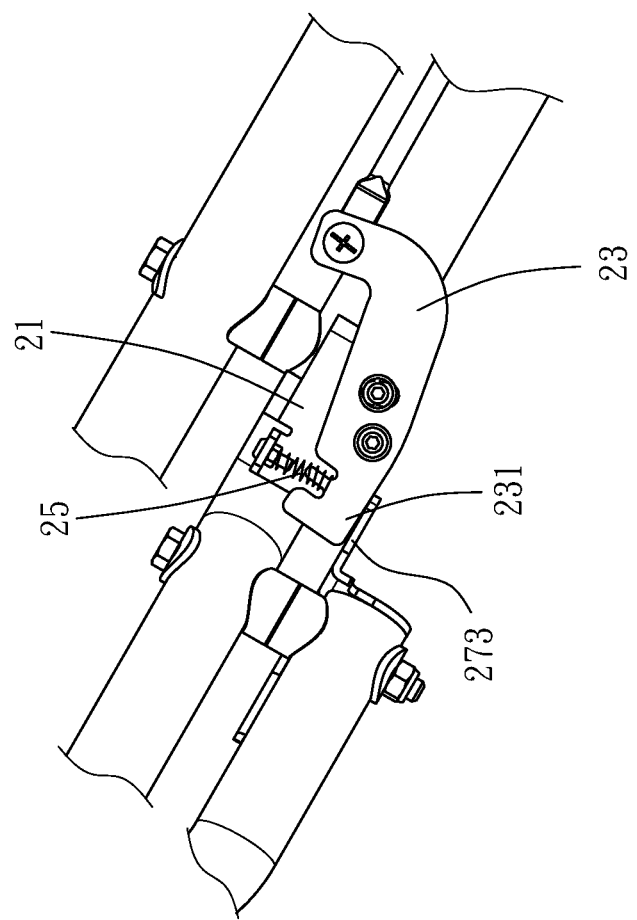
FIG. 6 is similar to FIG. 5, illustrating the abutment member disengaged from the first engagement structure.
Figure 7:
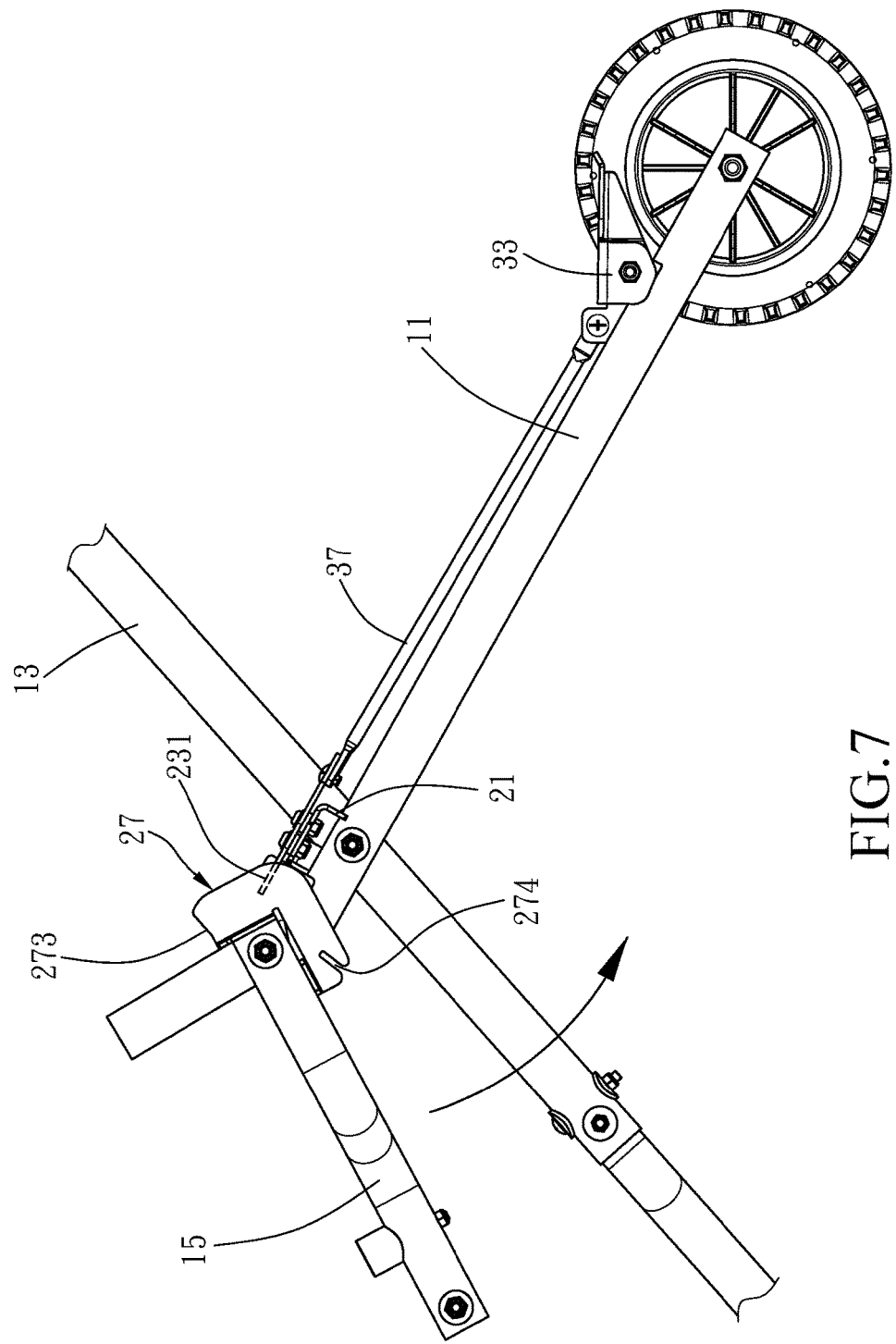
FIG. 7 is similar to FIG. 4, illustrating the biasing action of the support arm set.
Figure 8:
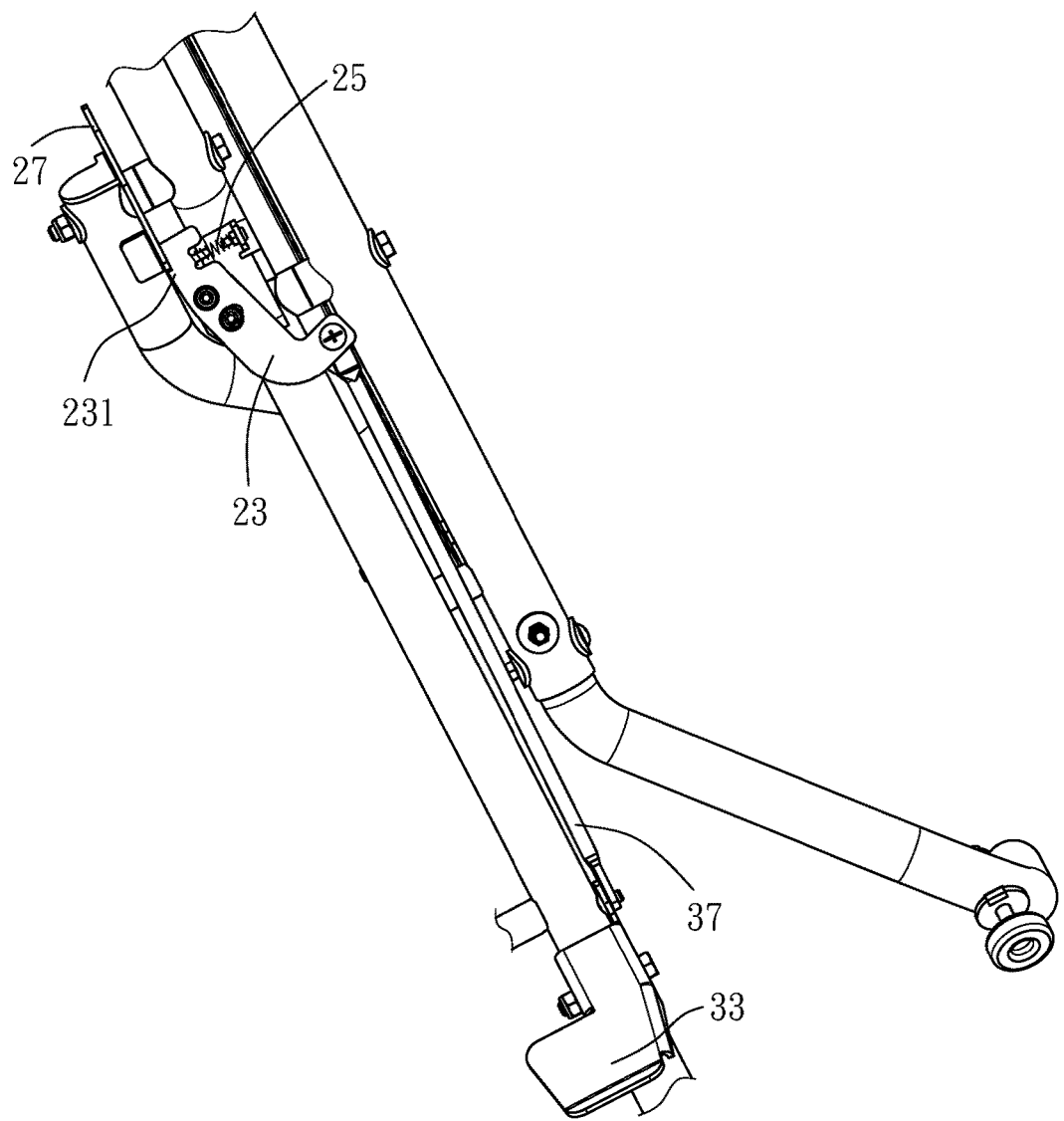
FIG. 8 is similar to FIG. 5, illustrating the abutment member engaged with the first engagement structure.

Referring to FIG. 1 and FIGS. 4-9, from the structure described above, it can be clearly seen that as a user first steps on the pedal 33 to bias the pedal 33 in order to convert the first and second stand legs 11, 13 from the extended position (see FIG. 1) to the collapsed or folded position (see FIG. 9), when the pedal 33 is biased, the link 37 is driven by the pedal 33 to trigger movement of the abutment member 23, causing the abutment end portion 231 of the abutment member 23 to compress the elastic member 25 and to bias from the position in abutment against the first engagement structure 273 (see FIG. 5) in a direction away from the bearing member 27 until the abutment member 23 is disengaged from the first engagement structure 273 of the bearing member 27 (see FIG. 6). At this time, the support arm set 15 is forced by gravity and its weight to bias backwardly downwards (see FIG. 7), allowing the user to keep biasing the pedal 33 and moving the first stand leg 11 and the rollers 17 forward. As soon as the first and second stand legs 11, 13 are received closely together, the user can then release the pedal 33, allowing the abutment member 23 to be forced by the elastic restoring energy of the elastic member 25 to be biased toward the bearing member 27 and to further move into engagement with the second engagement structure 274 of the bearing member 27 (see FIG. 8 and FIG. 9), and thus, the collapsible stand 1 is in a collapsed or folded position (see FIG. 9).

Figure 9:
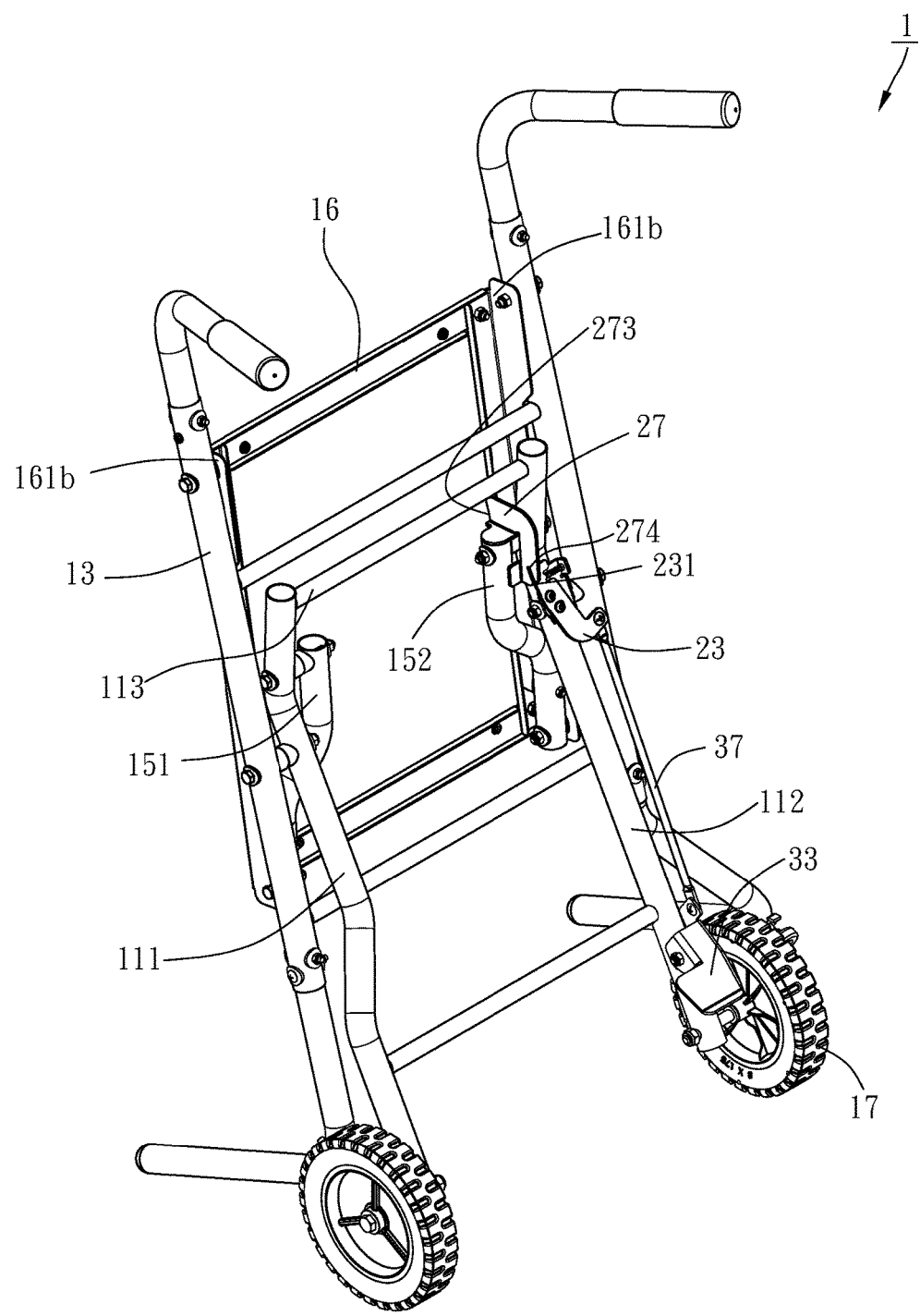
FIG. 9 is similar to FIG. 1, illustrating the collapsible stand in a collapsed or folded position.

Referring to FIG. 9, when wishing to convert the collapsible stand 1 from the collapsed or folded position (see FIG. 9) to the extended position (see FIG. 1), the user steps on the pedal 33 to bias the abutment member 23 away from the second engagement structure 274 of the bearing member 27. Then pressure is given continuously to the pedal 33 to further move the first stand leg 11, so that the first and second stand legs 11, 13 are extended out, and the first engagement structure 273 of the bearing member 27 is biased toward the abutment end portion 231 (see FIG. 6). As soon as the user releases the pedal 33, the abutment end portion 231 is abutted against the first engagement structure 273 (see FIG. 5), and the collapsible stand 1 is in a fully extended out position (see FIG. 1). The user can then mount the tool on the collapsible stand 1 for operation.

In conclusion, the collapsible stand 1 uses the control unit 30 to control engagement between the abutment member 23 of the positioning unit 20 and the bearing member 27, allowing the first and second stand legs 11, 13 to be selectively moved or converted between the extended position and the collapsed or folded position. When compared to the prior art collapsible stand design, the invention simplifies the structure and facilitates extending and folding of the collapsible stand 1 with less effort. Further, the structure of the collapsible stand 1 is highly stable, so that the tool can be stably supported on the collapsible stand 1. Thus, the collapsible stand 1 ensures a high level of operational safety and structural stability.

What is claimed is:

1. A collapsible stand, comprising:
   a support unit comprising a first stand leg, a second stand leg and a support arm set, said first stand leg and said second stand leg being crossed and pivotally connected with each other such that said first stand leg and said second stand leg are movable between an extended position and a folded position, said support arm set being pivotally connected to said first stand leg;
   a positioning unit comprising a mounting member, an abutment member, an elastic member, and a bearing member, said mounting member fixedly mounted at said first stand leg, said abutment member pivotally connected to said mounting member and comprising an abutment end portion, said elastic member having two opposite ends thereof respectively abutted against said mounting member and said abutment member, said bearing member mounted at said support arm set and comprising a first engagement structure and a second engagement structure; and
   a control unit comprising a pedal pivotally connected to said first stand leg, said pedal connected to said abutment member and operable to bias said abutment member toward said bearing member;
   wherein when said first stand leg and said second stand leg are set in said extended position, said abutment end portion is engaged with said first engagement structure and when said first stand leg and said second stand leg are set in said folded position, said abutment end portion is engaged with said second engagement structure.

2. The collapsible stand as claimed in claim 1, wherein said support arm set comprising a first support arm and a second support arm respectively pivotally connected to said first stand leg and spaced from each other at a distance, said second support arm comprising a top connection end portion and an opposing bottom connection end portion, said bearing member mounted at said bottom connection end portion.

3. The collapsible stand as claimed in claim 2, wherein said bottom connection end portion of said second support arm is a tubular member defining a virtual axis; said bearing member is a L-shaped member comprising a horizontal end portion and a vertical end portion, said horizontal end portion extending in a substantially parallel manner relative to said virtual axis of said bottom connection end portion of said second support arm, said vertical end portion extending substantially perpendicular to said virtual axis of said bottom connection end portion of said second support arm; said first engagement structure is mounted at said vertical end portion of said bearing member; said second engagement structure is mounted at said horizontal end portion of said bearing member.

4. The collapsible stand as claimed in claim 1, wherein said second engagement structure is a retaining groove.

5. The collapsible stand as claimed in claim 1, wherein said mounting member comprises an upright wall, and a first rod located at said upright wall; said abutment member comprises a second rod facing toward said first rod; said elastic member has the two opposite ends thereof respectively attached on said first rod and said second rod.

6. The collapsible stand as claimed in claim 1, wherein said abutment member further comprises an elongated slot; said positioning unit further comprises a screw inserted through said elongated slot of said abutment member and fastened to said mounting member.

7. The collapsible stand as claimed in claim 1, wherein said control unit further comprises a link, said link having two opposite ends thereof respectively pivotally connected to said abutment member and said pedal.

8. The collapsible stand as claimed in claim 1, wherein said control unit further comprises a holder block and a torsion spring, said holder block fixedly mounted at said first stand leg, said pedal and said torsion spring pivotally connected to said holder block by means of a pivot axle.

9. The collapsible stand as claimed in claim 1, wherein said first stand leg comprises two rollers bilaterally and pivotally mounted at a bottom end thereof.

10. A collapsible stand, comprising:
    a support unit comprising a first stand leg, a second stand leg and a support arm set, said first stand leg and said second stand leg being crossed and pivotally connected with each other such that said first stand leg and said second stand leg are movable between an extended position and a folded position, said support arm set pivotally connected to said first stand leg;
    a positioning unit comprising a mounting member, an abutment member, an elastic member and a bearing member, said mounting member fixedly mounted at said first stand leg, said abutment member pivotally connected to said mounting member and comprising an abutment end portion, said elastic member having two opposite ends thereof respectively abutted against said mounting member and said abutment member, said bearing member mounted at said support arm set and comprising a first engagement structure and a second engagement structure; and
    a control unit comprising a holder block, a torsion spring, a pedal and a link, said holder block fixedly mounted at said first stand leg, said pedal and said torsion spring pivotally connected to said holder block by a pivot axle, said link having two opposite ends thereof respectively pivotally connected to said abutment member and said pedal such that when said pedal is biased by an external force, said pedal drives said abutment member to bias toward said bearing member;
    wherein when said first stand leg and said second stand leg are set in said extended position, said abutment end portion is engaged with said first engagement structure and when said first stand leg and said second stand leg are set in said folded position, said abutment end portion is engaged with said second engagement structure.

* * * * *